120,449

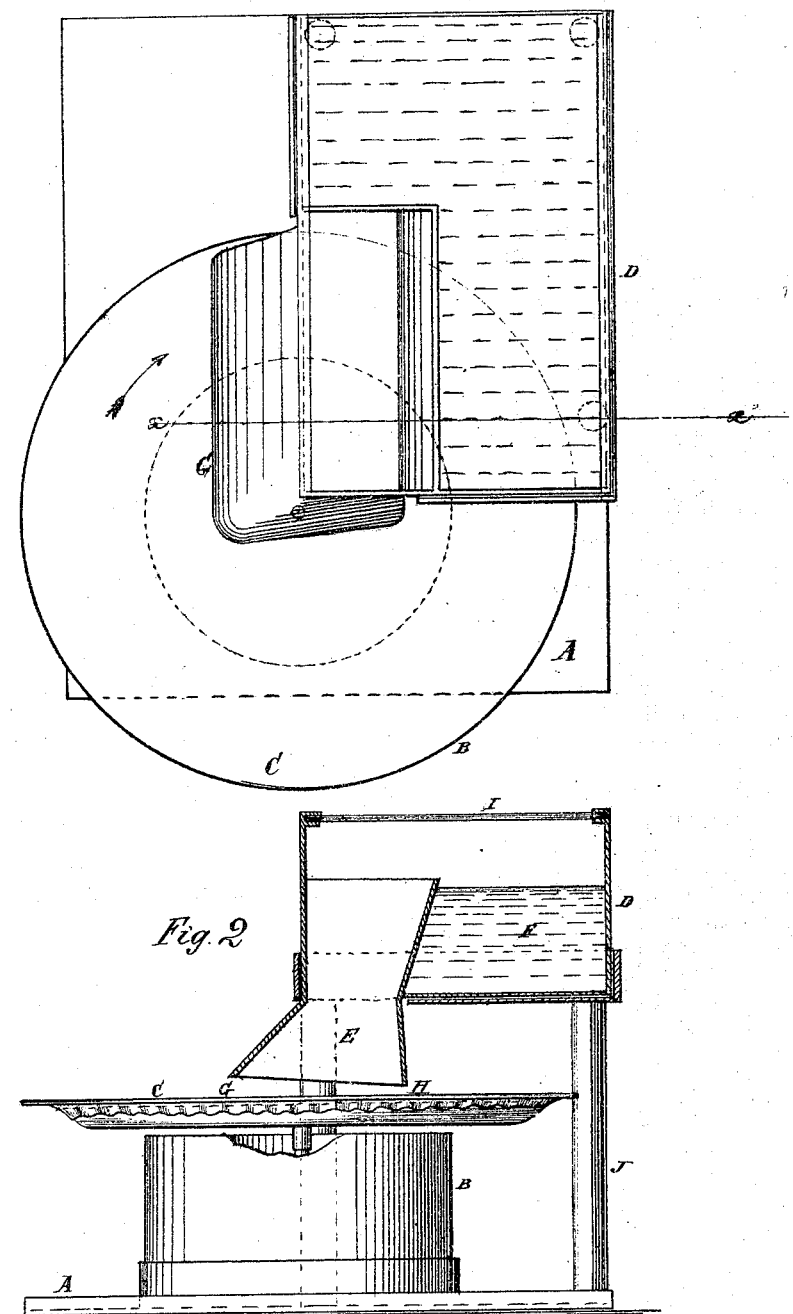

UNITED STATES PATENT OFFICE.

SAMUEL F. McGOWN, OF ROCKVILLE, INDIANA.

IMPROVEMENT IN FLY-TRAPS.

Specification forming part of Letters Patent No. 120,449, dated October 31, 1871.

*To all whom it may concern:*

Be it known that I, SAMUEL F. McGOWN, of Rockville, in the county of Parke and State of Indiana, have invented a new and useful Improvement in Fly-Trap; and I do hereby declare that the following is a full, clear, and exact description thereof, which will enable others skilled in the art to make and use the same, reference being had to the accompanying drawing forming a part of this specification.

The object of this invention is to provide a cheap and effective apparatus for catching flies; and it consists in a revolving wheel-flue and water-tank, arranged and operating as hereinafter described.

In the accompanying drawing, Figure 1 represents a top or plan view. Fig. 2 is a horizontal section taken on the line $x\ x$ of Fig. 1.

Similar letters of reference indicate corresponding parts.

A is a bed-plate. B is a cylinder containing clock-work, with the post of the minute-hand in an upright position. C is a wheel attached to the minute-hand post of the clock-work. When the clock-movement is wound up this wheel is revolved in a horizontal plane above the cylinder B. D is a tank or vessel placed above the revolving wheel, having a flue, E, passing through its bottom and extending upward therein to near the top, as seen in Fig. 2. The lower end of the flue is funnel-shaped, and is placed at an angle with the face of the wheel, as seen in Fig. 2. F represents water or other liquid in the tank D. The face of the wheel C is covered with molasses and water, or some other substance that will attract flies. The bottom of the flue covers a section of the wheel extending from or near the center to the edge of the wheel, and in width being equal to about half its length, as seen in Fig. 1. The wheel revolves in the direction indicated by the arrow, and the flies will be carried under the front edge of the flue or space G without being disturbed; but the back edge H is dropped down so near the wheel that it disturbs the flies. I is a glass cover to the tank. The flies, being disturbed, will rise from the wheel and fly upward toward the light, and, striking the glass, will drop to the water and be drowned. The tank is supported on an elevated table by the posts J and is readily removed for discharging the contents. The motion of the wheel is regulated by a speed-governor connected with the clock-movement in the cylinder B.

This apparatus works noiselessly and most effectually for the destruction of flies, and its advantages will at once be appreciated by all housekeepers.

Having thus described my invention, I claim as new and desire to secure by Letters Patent—

A trap for catching flies, consisting of the revolving wheel C, angular flue E, tank D, and glass top I, when the same are constructed and arranged to operate substantially as described.

SAMUEL F. McGOWN.

Witnesses:
CALVIN THOMO,
HENRY JOHNSON.

(143)